United States Patent
Fern

(10) Patent No.: US 9,752,535 B2
(45) Date of Patent: Sep. 5, 2017

(54) FUEL INJECTOR ASSEMBLY AND FUEL INJECTION SYSTEM

(71) Applicant: Crazy Diamond Performance Inc., Shelby Township, MI (US)

(72) Inventor: Kevin Fern, Bruce Township, MI (US)

(*) Notice: Subject to any disclaimer, the term of this patent is extended or adjusted under 35 U.S.C. 154(b) by 372 days.

(21) Appl. No.: 14/276,499

(22) Filed: May 13, 2014

(65) Prior Publication Data

US 2014/0338633 A1    Nov. 20, 2014

Related U.S. Application Data

(60) Provisional application No. 61/869,918, filed on Aug. 26, 2013, provisional application No. 61/823,576, filed on May 15, 2013.

(51) Int. Cl.
    *F02M 21/02* (2006.01)
    *F02D 41/00* (2006.01)

(52) U.S. Cl.
    CPC .... *F02M 21/0275* (2013.01); *F02M 21/0272* (2013.01); *F02D 41/0027* (2013.01); *F02M 21/0215* (2013.01); *F02M 21/0281* (2013.01); *F02M 21/0293* (2013.01); *Y02T 10/32* (2013.01)

(58) Field of Classification Search
    CPC ........... F02M 21/0275; F02M 21/0272; F02M 21/0281; F02M 21/0215; F02M 21/0293; F02M 21/023; F02M 21/0257; F02M 2200/858; F02M 61/14; F02D 41/0027; F02D 41/38; F02D 2041/389; Y02T 10/32; Y02T 10/44; Y02T 10/123

USPC .......... 123/294, 445, 470; 239/533.2, 533.3, 239/533.7
See application file for complete search history.

(56) References Cited

U.S. PATENT DOCUMENTS

| | | | |
|---|---|---|---|
| 4,437,443 A * | 3/1984 | Hofbauer | F02M 57/026 123/446 |
| 4,605,166 A | 8/1986 | Kelly | |
| 5,269,280 A | 12/1993 | Braun et al. | |
| 5,287,838 A * | 2/1994 | Wells | F02M 59/462 123/467 |
| 5,329,908 A | 7/1994 | Tarr et al. | |
| 5,505,384 A * | 4/1996 | Camplin | F02M 45/12 239/533.5 |
| 5,531,199 A | 7/1996 | Bryant et al. | |
| 5,641,121 A * | 6/1997 | Beck | F02M 47/027 239/1 |

(Continued)

*Primary Examiner* — Grant Moubry
(74) *Attorney, Agent, or Firm* — Dinsmore & Shohl LLP

(57) ABSTRACT

A fuel injector assembly is adapted to inject a compressed fuel into a combustion chamber of an internal combustion engine. The compressed fuel is stored in a fuel storage tank at a fuel storage pressure and delivered to the fuel injector assembly through a fuel supply line at a fuel supply pressure. The fuel supply pressure is lower than the fuel storage pressure. The fuel injector assembly includes a fuel injector and an adapter valve. The fuel injector injects the compressed gas fuel. The adapter valve is positioned between the fuel injector and the combustion chamber. The adapter valve allows the compressed gas fuel injected by the fuel injector to be discharged from an outlet of the adapter valve into the combustion chamber in an injection direction while preventing blowback gas entering the outlet from passing through the adapter valve in an ingress direction opposite the injection direction.

25 Claims, 8 Drawing Sheets

(56) References Cited

U.S. PATENT DOCUMENTS

| | | | | |
|---|---|---|---|---|
| 5,950,596 | A | * | 9/1999 | Kollmann ............... F02B 25/20 |
| | | | | 123/298 |
| 6,595,182 | B2 | * | 7/2003 | Oprea .................... F02B 19/12 |
| | | | | 123/295 |
| 6,655,603 | B2 | * | 12/2003 | Long .................... F02M 59/462 |
| | | | | 239/5 |
| 7,140,354 | B1 | | 11/2006 | Hashemi |
| 8,311,723 | B2 | * | 11/2012 | McAlister ................. F02B 3/06 |
| | | | | 123/297 |
| 2006/0186230 | A1 | * | 8/2006 | Adams ............... F02M 21/0269 |
| | | | | 239/585.1 |
| 2011/0297120 | A1 | * | 12/2011 | Hurt ....................... F02B 41/06 |
| | | | | 123/25 A |
| 2012/0186560 | A1 | * | 7/2012 | Lund .................. F02D 19/0642 |
| | | | | 123/495 |

\* cited by examiner

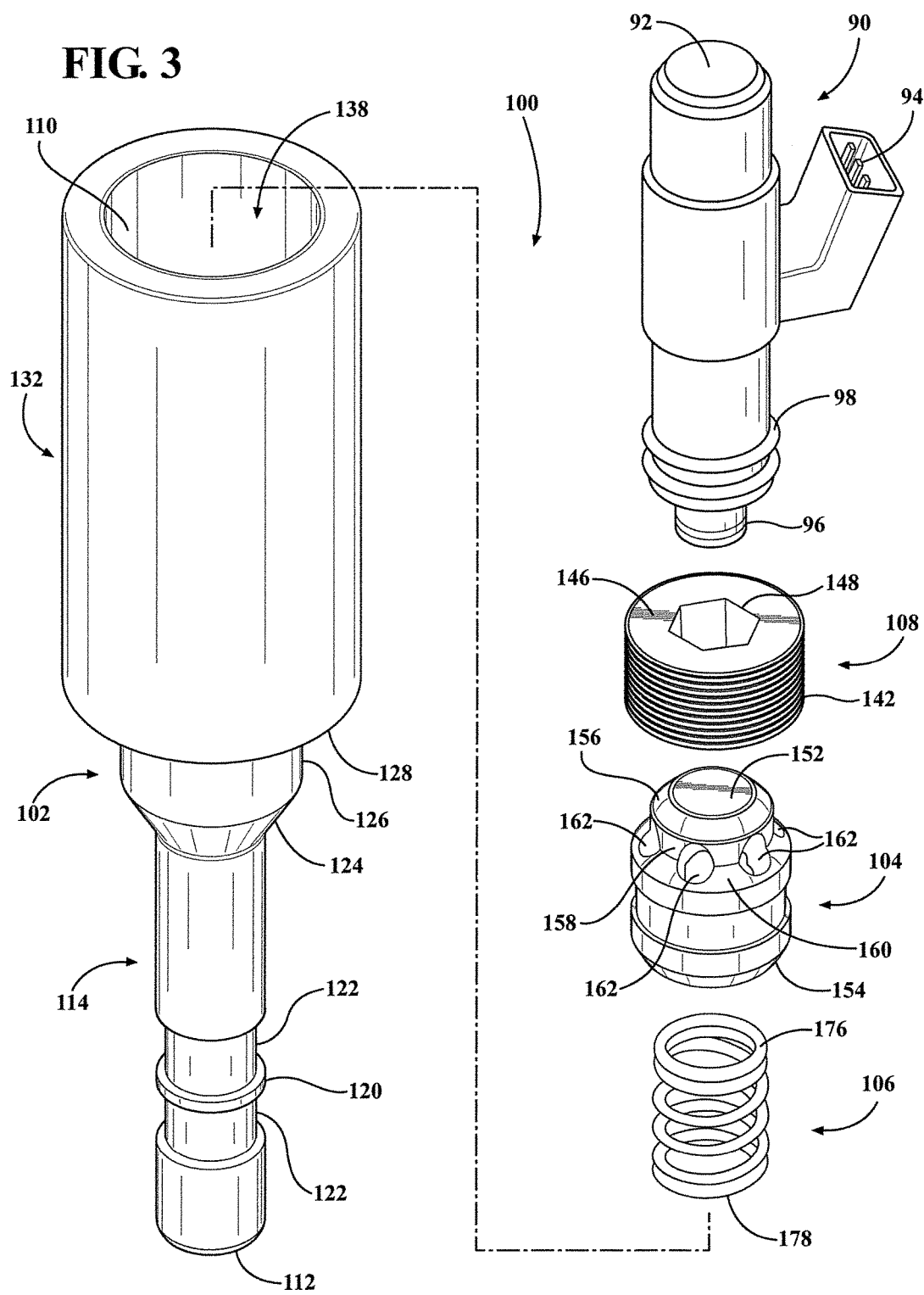

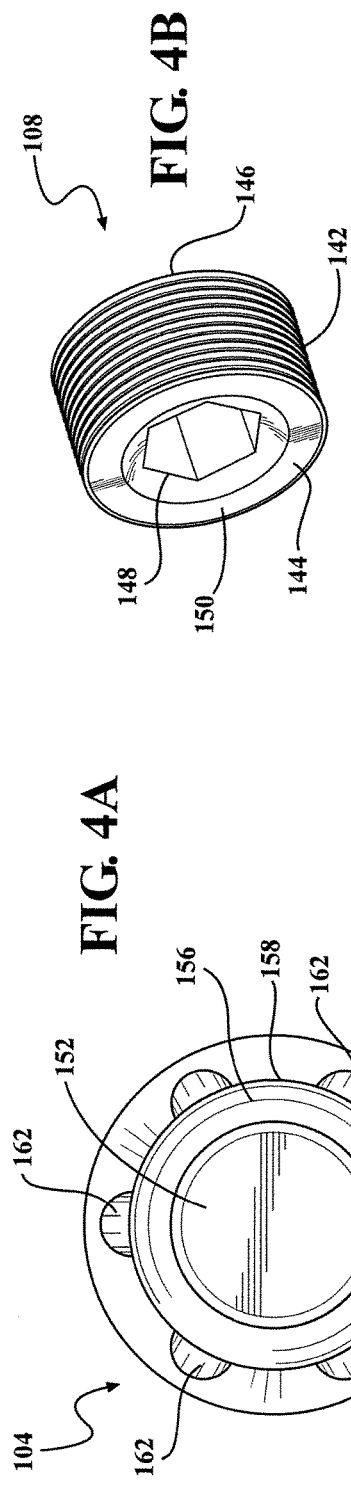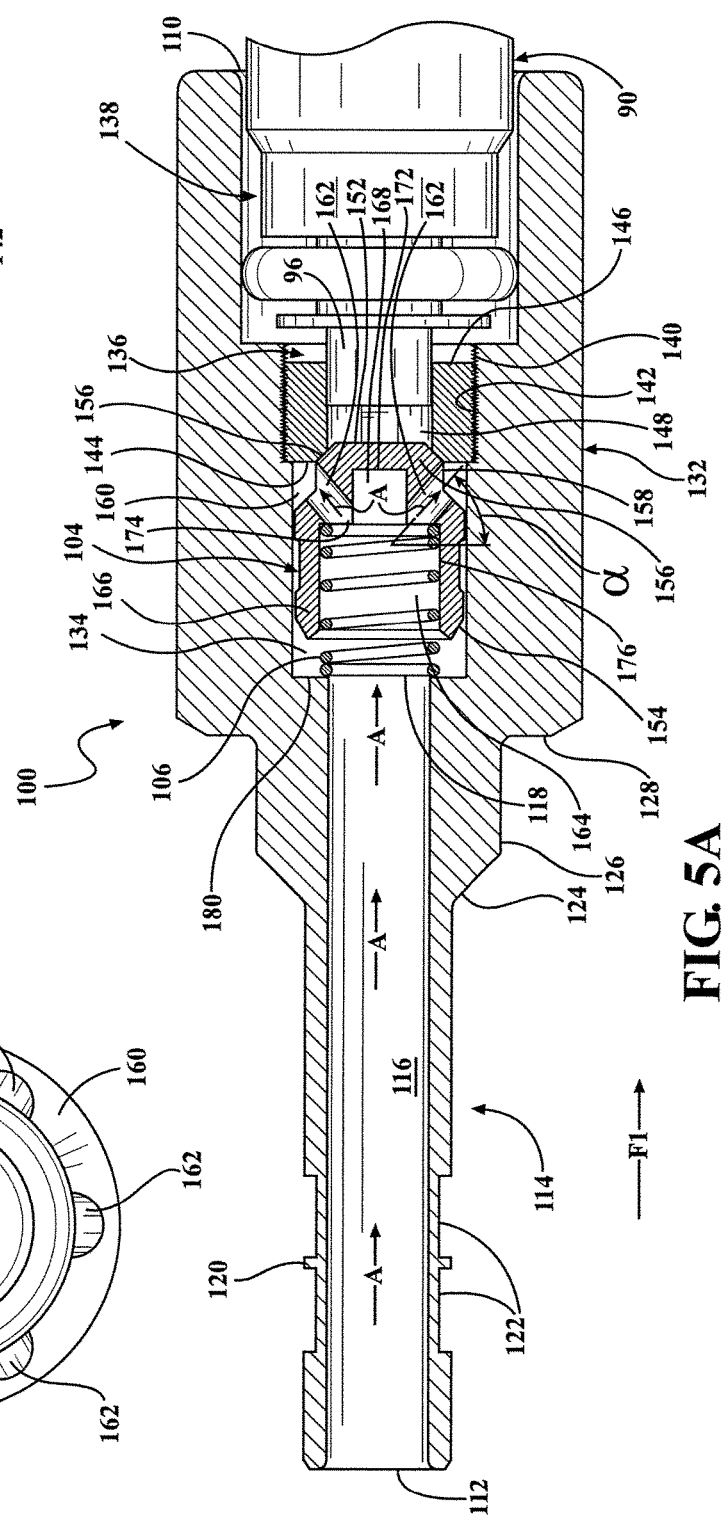

FUEL INJECTOR ASSEMBLY AND FUEL INJECTION SYSTEM

CROSS-REFERENCE TO RELATED APPLICATIONS

This application claims priority to U.S. Provisional Patent Application Ser. No. 61/823,576 filed May 15, 2013 and U.S. Provisional Patent Application Ser. No. 61/869,918 filed Aug. 26, 2013, both of which are incorporated herein by reference.

FIELD OF THE INVENTION

The present invention is directed to a fuel injection assembly configured to utilize an alternative compressed fuel in direct injection. More particularly, a fuel injector assembly configured to convert a conventional alternative compressed fuel port injector for use in direct injection.

BACKGROUND OF THE INVENTION

Recently, compressed fuels have received increased interest for development as an alternative fuel source for gasoline. One such compressed fuel is compressed natural gas which provides a stable fuel source and provides a cost-effective contribution to cleaner mobility.

Previous automotive uses for compressed natural gas, as an alternative to gasoline, in internal combustion engine have been primarily limited to indirect (port) injection fuel systems in which a port fuel injector injects the compressed natural gas into an air flow intake. In indirect injection, the injected fuel and air from the air intake is drawn into the combustion chamber due to a vacuum caused by the downward stroke of the piston when the intake valve is opened.

However, the advantages in increased fuel efficiency and higher power output of direct injection systems over port injection fuel systems have led to an increased focus on direct injection systems. As such, there has been an increased demand for the use of alternative fuels in direct injection fuel systems to combine the benefits of alternative compressed gas fuels, such as compressed natural gas, with the increased fuel efficiency and higher power output of direct injection systems. In previously known gasoline direct injection engine systems, gasoline is injected at high pressure in the range of 1,600 psi. In direct injection gasoline engines the injection timing is limited during the compression stroke of the piston.

There are disadvantages of direct fuel injection systems. One particular disadvantage of the direct injection fuel systems is the added expense due to the increase in the required resiliency of the injectors. Direct injection fuel injectors are disposed partially within the cylinder which exposes the injectors to the intense heat and pressure of combustion. As such, there is an increase in the cost of direct fuel injectors as compared with indirect fuel injectors.

A limiting factor in utilizing compressed natural gas in a direct injection fuel system is the pressure regulation of the compressed natural gas. In the fuel storage tank, the compressed natural gas is stored at a high pressure to maximize the stored volume of the compressed natural gas and the packaging requirements of the vehicle. The stored high pressure compressed natural gas is first depressurized by a regulator to <300 psi. In order to utilize direct injection, the decreased pressure of the natural gas will once again undergo an increase in pressure. This recompression of the fuel is costly in terms of recompression inefficiency due to the packaging and additional components required to recompress the fuel which can lead to a reduction in engine efficiency. Further, as low pressure compressed natural gas fuel injectors are unable to withstand blowback pressure during the combustion stroke of the engine, when located in the combustion chamber, costly direct injection compressed natural gas injectors would be required to withstand the heat and pressure of combustion.

Thus, there exists a need for a cost effective and simple conversion for utilizing low pressure compressed gas fuels in direct injection.

SUMMARY OF THE INVENTION

The present invention provides a fuel injector assembly and fuel injection system in which a conventional port compressed natural gas injector is adapted to inject compressed natural gas in a direct injection internal combustion engine.

In brief, the fuel injector assembly is adapted to inject a compressed gas fuel into a combustion chamber of an internal combustion engine. The compressed gas fuel is stored in a fuel storage tank at a fuel storage pressure and delivered to the fuel injector assembly through a fuel supply line at a fuel supply pressure. The fuel supply pressure is lower than the fuel storage pressure. The fuel injector assembly includes a fuel injector and an adapter valve.

The fuel injector is connected to the fuel supply line and is configured to inject the compressed gas fuel. The adapter valve is positioned between the fuel injector and the combustion chamber. The adapter valve has an inlet and an outlet. The inlet is adapted to receive a portion of the fuel injector. The outlet is in communication with the combustion chamber. The adapter valve allows the compressed gas fuel injected by the fuel injector to be discharged from the outlet into the combustion chamber in an injection direction while preventing blowback gas entering the outlet from passing through the adapter valve in an ingress direction opposite the injection direction.

The fuel injection system may also include a crank angle sensor that detects a crank angle of a crank shaft of the internal combustion engine. Additionally, an injection timing control unit may be provided. The injection timing unit is programmed to compare the crank angle detected by the crank angle sensor to determine the current stroke of the cylinder in the internal combustion engine. The injection timing control unit is also programmed to control a fuel injector to initiate injection at a beginning of an intake stroke and to inhibit injection after the completion of the intake stroke.

BRIEF DESCRIPTION OF THE DRAWINGS

Reference will now be made to the attached drawings, when read in conjunction with the following detailed description, wherein like references refer to like parts throughout the several views and in which:

FIG. 3 is an exploded perspective view of the fuel injector assembly;

FIG. 4A is a top plan view of the plug valve of the fuel injector assembly;

FIG. 4B is a perspective view of the insert;

FIG. 5A is a schematic view of the fuel injector assembly in an injection state;

DETAILED DESCRIPTION OF THE PREFERRED EMBODIMENTS

The present invention has utility as a fuel injector assembly operable to convert a conventional low pressure compressed gas fuel injector, designed for indirect injection, for use in a direct fuel injection system. The direct fuel injector assembly includes a fuel injector and an adapter valve configured to adapt the indirect fuel injector for use in the direct injection system.

The adapter valve is positioned between the combustion chamber of the internal combustion chamber and the fuel injector. The adapter valve allows for the fuel injected by the fuel injector to be discharged into the combustion chamber and prevents blowback gas, from the combustion of the injected fuel, from reaching and damaging the fuel injector.

The fuel injection system utilizes the fuel injector and the adapter valve with a crank angle sensor and an injection timing control unit. The injection timing control unit controls the fuel injector to extend the injection period beyond the intake stroke, as the fuel is injected at a low pressure, compared to typical gasoline direct injections systems.

Figure 1:
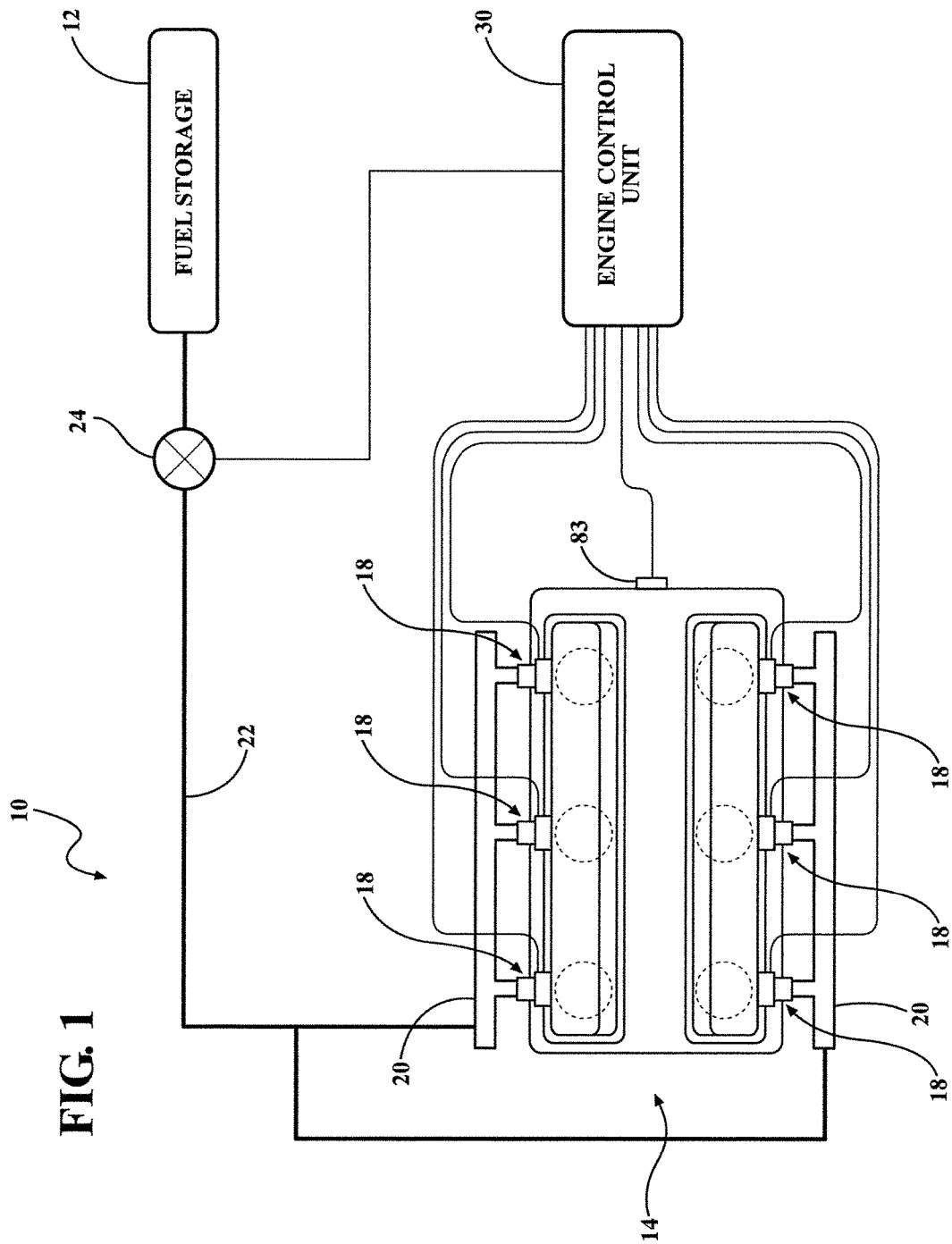
FIG. 1 is a schematic of a fuel injector system for a direct inject natural gas.

With reference to FIG. 1, a direct fuel injection system using an alternative compressed fuel for an internal combustion engine is generally illustrated at 10. The system includes a storage tank 12 in which the alternative compressed fuel is stored in a compressed state. In the remaining description the alternative compressed fuel will be described as a Compressed Natural Gas (CNG); however, the alternative compressed fuel is not limited only to CNG and illustratively includes Liquefied Natural Gas (LNG), Liquid Petroleum Gas (LPG), Hydrogen (H2), Liquefied Hydrogen gas (LH2) or any other compressed fuel known to those skilled in the art and suggested by this disclosure.

In the illustrated embodiment, the storage tank 12 stores the CNG at a CNG storage pressure. The CNG storage pressure is within a range of 3,000 psi to 5,000 psi, preferably at 3,600 psi. Although not shown, the storage tank 12 is provided with a fueling port allowing the storage tank 12 to be refilled with the CNG.

The direct fuel injection system 10 includes an internal combustion engine 14 having a plurality of cylinders each of which includes a direct fuel injector assembly 18. The fuel injector assemblies 18 are attached to fuel rails 20 and connected to the storage tank 12 through a fuel supply line 22.

A regulator 24 is provided on the fuel supply line 22 and disposed between the storage tank 12 and the fuel rails 20. The regulator 24 regulates the CNG from the high CNG storage pressure to a lower fuel supply pressure. The fuel supply pressure of the CNG after the regulator 24 is typically less than 500 psi preferably less than 300 psi. The CNG at the fuel supply pressure is supplied to the fuel rails 20 and direct injected into the internal combustion engine 14 by the fuel injector assemblies 18, which will be described in greater detail below.

As will be described in greater detail below, the direct fuel injection system 10 includes an electronic control unit (ECU) 30 which controls the injection timing and amount of the fuel injector assemblies 18 based on signals from various sensors. The ECU 30 is connected to the regulator 24 to control the dispersion of the CNG from the storage tank 12. Although not shown, the ECU 30 is optionally connected to a CNG pump which is provided either upstream or downstream from the regulator 24 to ensure proper movement and pressure of the CNG along the fuel supply line 22.

Figure 2:
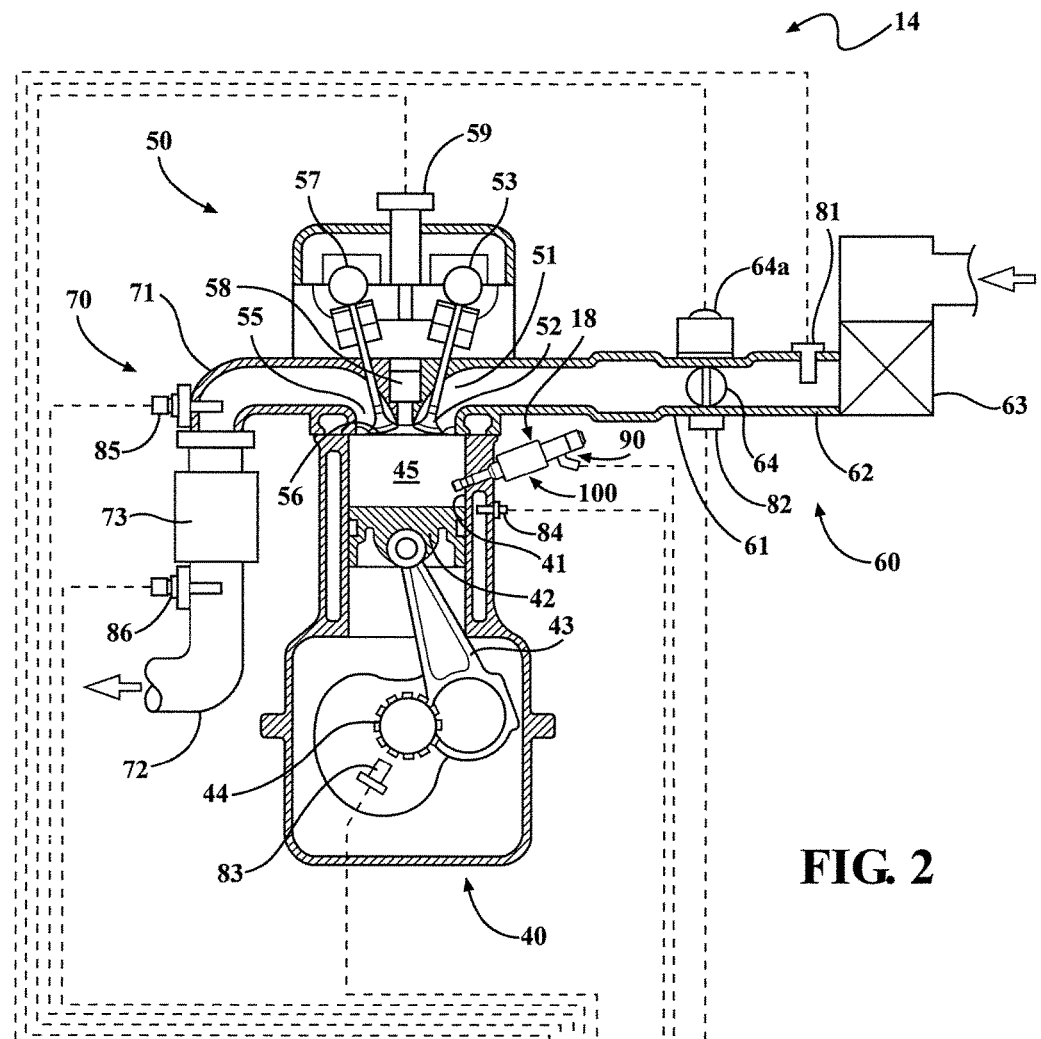
FIG. 2 is a schematic diagram of an internal combustion engine to which a direct fuel injector assembly is applied.

FIG. 2 illustrates a schematic structure of the direct fuel injection system 10 in which the direct fuel injector assembly 18 has been applied to the internal combustion engine 14. The internal combustion engine 14 is a four-cycle spark-ignition multiple cylinder (six cylinder) engine; however, the internal combustion engine 14 is not limited to such a configuration. Only a single cross section of one of the plurality of cylinders has been illustrated as the remaining cylinders have the same structure as the illustrated cylinder.

The internal combustion engine 14 includes a cylinder block portion 40, a cylinder head portion 50 that is fixed to an upper portion of the cylinder block portion 40, an intake system 60 for introducing gas that is a mixture of air and fuel (i.e., an air-fuel mixture) into the cylinder block portion 40, an exhaust system 70 for discharging gas (i.e., exhaust gas) from the cylinder block portion 40 to outside of the internal combustion engine 14, an accelerator pedal 26, and various sensors 81 to 87 connected to the electronic control unit (ECU) 30.

The cylinder block portion 40 includes a cylinder 41, a piston 42, a connecting rod 43, and a crankshaft 44. The piston 42 moves in a reciprocating manner inside the cylinder 41. The reciprocating movement of the piston 42 is transmitted to the crankshaft 44 via the connecting rod 43, causing the crankshaft 44 to rotate. A combustion chamber 45 is defined by an inner peripheral surface of the cylinder 41, an upper surface of the piston 42, and a lower surface of the cylinder head portion 50. As will be described in greater detail below, the fuel injector assembly 18 injects the compressed fuel (CNG) into the combustion chamber 45.

The cylinder head portion 50 includes an intake port 51, an intake valve 52, an intake camshaft 53, an exhaust port 55 that is communicated with the combustion chamber 45, an exhaust valve 56, an exhaust camshaft 57, a spark plug 58, and an igniter 59. The intake port 51 is in communication with the combustion chamber 45 and the intake valve 52 opens and closes the intake port 51. The intake camshaft 53 drives the intake valve 52. The exhaust port 55 is in communication with the combustion chamber 45 and the exhaust valve 56 opens and closes the exhaust port 55. The exhaust camshaft 57 drives the exhaust valve 56. The igniter 59 includes an ignition coil that generates high voltage that is applied to the spark plug 58.

The intake system 60 includes an intake manifold 61, an intake pipe 62, an air cleaner 63, an intake throttle valve 64, and a throttle valve actuator 64a. The intake manifold 61 is in communication with each cylinder 41 via the intake port 51 described above. The intake pipe 62 is connected to a uniting portion upstream of the intake manifold 61. The air cleaner 63 is provided on an end portion of the intake pipe 62. The intake throttle valve 64 is capable of changing the opening sectional area of the intake pipe 62, and the throttle valve actuator 64a rotatably drives the intake throttle valve 64 according to a command signal from the ECU 30. The intake port 51, the intake manifold 61, and the intake pipe 62 together form an intake passage.

The exhaust system 70 includes an exhaust manifold 71, an exhaust pipe 72, and an exhaust gas catalyst 73. The exhaust manifold 71 is in communication with each of the cylinders 41 via the exhaust port 55 described above. The exhaust pipe 72 is connected to a uniting portion downstream of the exhaust manifold 71. The exhaust gas catalyst 73 is provided in the exhaust pipe 72. The exhaust port 55, the exhaust manifold 71, and the exhaust pipe 72 together form an exhaust passage.

The accelerator pedal 26 is operated by a driver of a vehicle provided with the internal combustion engine 14. The accelerator pedal 26 inputs an acceleration request and the required torque to the internal combustion engine 14.

The direct fuel injection system 10 is provided with various sensors 81 to 87 to maintain control over operation of the internal combustion engine 14, such as an intake air amount sensor 81, a throttle valve opening amount sensor 82, a crank position sensor 83, a coolant temperature sensor 84, air-fuel ratio sensors 85 and 86, and an accelerator operation amount sensor 87.

The crank position sensor 83 is provided near the crankshaft 44. The crank position sensor 83 is configured to output a first signal indicative of the operation condition of the piston 42 cycle such as which stroke the cylinder 41 is currently undergoing. The crankshaft 44 rotates through two rotations as the cylinder 41 undergoes the intake, compression, combustion and exhaust strokes. As described in greater detail below, the current stroke of the cylinder 41 is able to be determined based on the output of the crank position sensor 83.

The ECU 30 includes a CPU 31, ROM 32 in which programs to be executed by the CPU 31, as well as constants and tables (maps), have been stored in advance, RAM 33 in which data is temporarily stored as necessary by the CPU 31, back-up RAM 34 that stores data when a power supply is on and retains the stored data while the power supply is off, and an interface 35 that includes an AD converter. The CPU 31, the ROM 32, the RAM 33, the back-up RAM 34, and the interface 35 are all connected together by a bus.

The interface 35 is connected to the various sensors 81 to 87 and is configured to transmit the signals output from these sensors to the CPU 31. In addition, the interface 35 is connected to the fuel injector assembly 18, the igniter 59, and the throttle valve actuator 64a and the like. The CPU 31 is configured to send command signals to the fuel injector assembly 18, the igniter 59, and the throttle valve actuator 64a to control injection timing and ignition of the internal combustion engine 14 based on the output of the various sensors 81 to 87.

With reference to FIG. 3, the fuel injector assembly 18 includes a compressed natural gas fuel injector (CNG injector) 90 and an adaptor valve 100. It is appreciated, of course, that CNG injector 90 and the adaptor valve 100 are separate elements for connect to form the fuel injector assembly 18. As separate elements, the adaptor valve 100 is optionally utilized with a variety of different CNG injectors 90, and allows for quick and easy installation. It is appreciated, of course, that fuel injector assembly 18 is optionally a one piece unit in which the CNG injector 90 and the adaptor valve 100 are formed as a monolithic structure.

The CNG injector 90 is optionally a conventional low pressure compressed natural gas injector such as a low pressure CNG injector sold under the brand name Delphi Multec® used for indirect injection fuel systems in which the CNG is injected into the intake pipe 62 upstream of the intake port 51. As the CNG injector 90 is designed for intake (port) injection, injection pressure is within the range of 75 to 150 psi, preferably at 120 psi.

The CNG injector 90 includes a fuel inlet 92 that is in communication with the fuel supply line 22 through the fuel rail 20. It is appreciated, of course, that the fuel inlet 92 of the CNG injector 90 is directly connected to the fuel supply line 22. The CNG injector 90 further includes an electrical connector 94 which allows the CNG injector 90 to be in electrical communication with the ECU 30 through the interface 35. The CNG injector 90 includes an injector nozzle 96 through which the CNG injector 90 discharges the CNG upon control from the ECU 30. A seal 98 is provided around the injector nozzle 96. The seal 98 is optionally a deformable resilient member that, upon insertion into an aperture of corresponding size, provides a secure frictional engagement between the CNG injector 90 and the aperture.

Figure 5B:
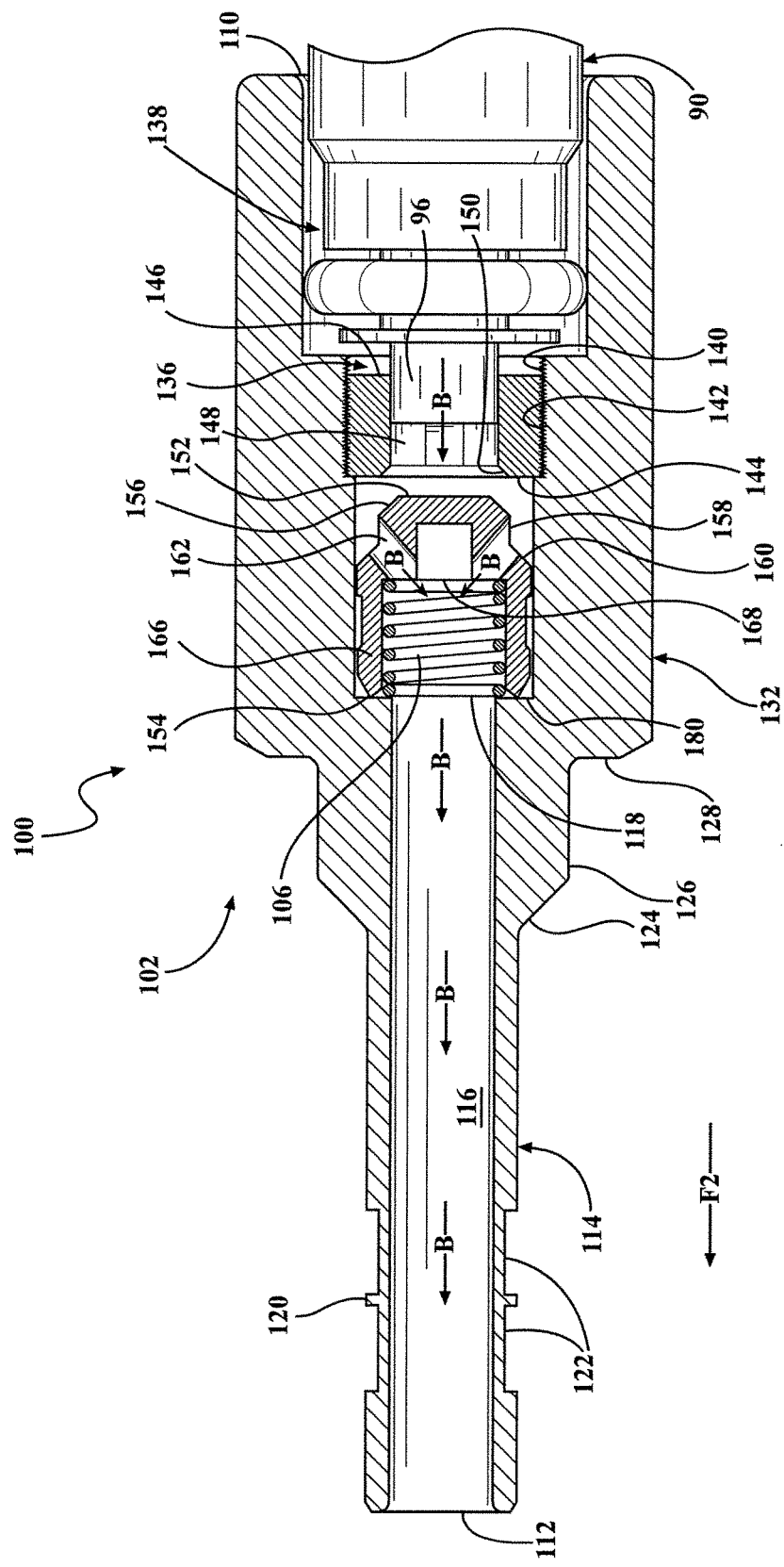
FIG. 5B is a schematic view of the fuel injector assembly in a closed state.

The adapter valve 100 includes a housing 102, a plug or bullet 104, a biasing member 106, and an insert 108. The housing 102 is formed as a tiered cylindrical shape having a gas path extending from an inlet 110 and an outlet 112. The housing 102 includes a nozzle portion 114 formed as a hollow shaft having the outlet 112 at a distal end thereof. The nozzle portion 114 includes a nozzle passage 116 that extends from the outlet 112 to a nozzle inlet 118, as seen in FIG. 5A-5B.

The nozzle portion 114 includes a sealing portion in which a seal member 120 is positioned between two recessed portions 122. The seal member 120 and the recessed portions 122 are positioned on the nozzle portion 114 upstream of the outlet 112. The seal member 120 allows for the housing 102, specifically the nozzle portion 114, to be secured to within an injector aperture that is formed within the cylinder 41 and extends, at least partially, into the combustion chamber 45. The seal member 120 provides a seal which prevents the ejection of the housing 102, and consequently the fuel injector assembly 18, from its engagement with the combustion chamber 45, specifically, the injector aperture.

The nozzle portion 114 is provided with a tiered portion including a first tapered portion 124 that extends the outer diameter of the nozzle portion 114 to an outer diameter of a second shaft portion 126. The outer diameter of the second shaft portion 126 is larger than the diameter of the nozzle portion 114; however, the inner diameter of the nozzle portion 114 is constant from the outlet 112 to the nozzle inlet 118 along the entire nozzle passage 116. The second shaft portion 126 further includes a second tapered portion 128 in a stepwise manner. The tiered portion of the nozzle portion 114 allows for the nozzle portion 114 to fit various configurations of injector apertures of combustion chambers 45 having various sizes.

The housing 102 further includes a chamber portion 132 that defines a hollow chamber that extends from the nozzle inlet 118 to the inlet 110 of the housing 102. The chamber portion 132 is formed of a bullet chamber 134, an insert chamber 136 and an injector chamber 138. The insert chamber 136 is positioned between the bullet chamber 134 and the injector chamber 138. The bullet chamber 134 is positioned between the nozzle inlet 118 and the insert chamber 136 and the injector chamber 138 is positioned between the insert chamber 136 and the inlet 110 of the housing 102. The injector chamber 138, the inset chamber 136, the bullet chamber 134, and the nozzle passage 116 provide a pathway from the inlet 110 to the outlet 112.

The bullet chamber 134 is formed having a generally hollow cylindrical shape. The bullet chamber 134 is formed having an inner diameter that is the same or less than the inner diameter of the insert chamber 136 and the inner diameter of the injector chamber 138. The bullet chamber 134 is sized so as to receive the bullet 104 in a sliding relationship, as will be described in greater detail below.

The insert chamber 136 is formed having an inner diameter that is the same or greater than the inner diameter of the bullet chamber 134. The insert chamber 136 is provided with internal threads 140. The insert chamber 136 is configured to receive the insert 108. The insert 108 is formed generally as a ring-shaped member.

The insert 108 includes external threads 142 that are configured to engage the internal threads 140 of the insert chamber 136 to secure the insert 108 therein. The insert 108 includes a downstream (bullet) side 144, an upstream (injector) side 146, and a bore 148 that extend from the downstream side 144 to the upstream side 146. The bore 148 is optionally provided having a hexagonal cross-sectional shape, so as to facilitate the engagement of the external threads 142 of the insert 108 with the internal threads 140 of the insert chamber 136.

The downstream side 144 of the insert 108 is provided with a seat portion 150 that bounds the bore 148 to increase the diameter of the bore 148 adjacent the downstream side 144 of the insert 108. The seat portion 150 is provided at an angle of generally 45 degrees with the downstream side 144 of the insert 108, as seen in FIG. 4B. It is appreciated, of course, that various angles can be incorporated without deviation from the scope of the invention as will be described in greater below.

The injector chamber 138 of the chamber portion 132 is configured to receive at least a portion of the injector nozzle 96. The CNG injector 90 is partially received within the injector chamber 138, specifically, the injector nozzle 96 portion is received within the bore 148 adjacent the upstream side 146 of the insert 108 and the seal 98 provides a frictional engagement between the inner surface of the injector chamber 138 and the CNG injector 90 to retain the CNG injector 90 within the housing 102. It is appreciated, of course, that the engagement of the CNG injector 90 and the injector chamber 138 is not limited to the frictional engagement due to the seal 98.

The bullet 104 is formed as a generally cylindrical member having a first end 152 and an opposite second end 154. As will be described in greater detail below, the bullet 104 is positioned within the bullet chamber 134 such that the first end 152 is positioned adjacent the insert 108 and the second end 154 is positioned adjacent the nozzle inlet 118 of the nozzle portion 114.

The bullet 104 is slidably received within the bullet chamber 134 between an injection position, as seen in FIG. 5B, and a closed position, as seen in FIG. 5A. In order to facilitate the sliding of the bullet 104 within the bullet chamber 134, the bullet is optionally covered in a lubricating film, such as a dry molybdenum disulfide lubricant, to reduce wear and tear on the components of the fuel injector assembly 18. However, the lubricant is not limited to such a film and optionally includes a liquid lubricant, oil based lubricant, other dry lubricants, or any other lubricant known to those skilled in the art to reduce friction under the conditions of the fuel injector assembly 18. The lubricant further helps to prevent carbon from adhering to the bullet 104, and prevents oils and aerosols from clogging the passageways of the bullet 104, the inlet 110, and the nozzle inlet 118 of the nozzle portion 114.

The first end 152 of the bullet 104 is formed having a generally flattened circular shape. It is appreciated, of course, that the first end 152 is not limited to such a shape and optionally is provided with a bulbous or semi-spherical shape. The first end 152 has a diameter smaller than the diameter of the seat portion 150 at the downstream side 144 of the insert 108 and larger than the opening formed by the bore 148 of the insert 108.

An engagement portion 156 surrounds the first end 152. The engagement portion 156 extends radially from the first end 152 and expands along the diameter bullet 104 moving from the first end 152 towards the second end 154. The engagement portion 156 is provided to have a corresponding angle to the seat portion 150 of the insert 108.

A generally cylindrical shoulder 158 extends between the engagement portion 156 and a tapered portion 160. The shoulder 158 has a diameter that is larger than the first end 152 but smaller than the tapered portion 160 as seen in FIG. 4A. A plurality of passages 162 extend from the shoulder 158, specifically, a junction of the shoulder 158 and the tapered portion 160.

As seen in FIGS. 5A-5B, the second end 154 of the bullet 104 is formed as a generally hollow member defining a first cavity 164. Specifically, the second end 154 is formed by an annular wall 166 to define the first cavity 164. A second cavity 168 is formed adjacent the first cavity 164, the second cavity 168 having a diameter that is smaller than the diameter of the first cavity 164. The second cavity 168 being bound by an annular inner wall 170 and an end wall 172. A stepped wall 174 bounds the opening of the second cavity 168 and extends between the annular inner wall 170 and the annular wall 166 in between the openings of the plurality of passages 162.

The plurality of passages 162 extend between the exterior of the bullet 104 and the second cavity 168 which is in communication with the first cavity 164 that is open to the second end 154. Specifically, the plurality of passages 162 extend from the junction of the shoulder 158 and the tapered portion 160, to the annular inner wall 170 to open to the second cavity 168. As the second cavity 168 is open to the first cavity 164, which includes the open second end, a bullet bypass path is formed from the plurality of passages 162, the first cavity 164, the second cavity 168, and the second end 154. The bullet bypass path allows gas to bypass the bullet 104 in the direction of arrow F2 in FIG. 5B.

The bullet 104 is optionally formed with a total of six passages 162 are formed equally spaced around the first end 152, as shown in FIG. 4A; however, the bullet 104 is not limited to six passages and optionally includes more or less than six passages total. The plurality of passages 162 are disposed to extend at a predetermined angle α with a longitudinal axis (or an axis perpendicular to the longitudinal axis) of the bullet 104. The predetermined angle α extends obliquely with the longitudinal axis of the bullet 104, preferably the predetermined angle α extends at a 45° angle to the longitudinal axis of the bullet 104; however, various other angles are within the scope of the disclosure.

The biasing member 106 includes a bullet end 176 and an opposite housing end 178. The bullet end 176 of the biasing member 106 is received within the first cavity 164 and abuts the stepped wall 174 to bias the bullet 104 towards the closed position, as best shown in FIG. 5B. The housing end 178 of the biasing member 106 abuts an end wall 180 of the bullet chamber 134. The end wall 180 bounds the nozzle inlet 118. As such, the first cavity 164 is formed to have a diameter larger than the diameter of the biasing member 106, so as to receive the biasing member 106 therein, and the nozzle inlet 118 is formed to have a diameter that is less than the diameter of the biasing member 106 to prevent the biasing member 106 from entering the nozzle path 116.

The biasing member 106 is optionally formed as a coil spring having a generally open interior that allows for the compressed gas fuel, such as CNG, to be passed therethrough as will be described in greater detail below.

In order to facilitate a better understanding of the fuel injector assembly 18, the operation of the fuel injection assembly 18 will now be discussed. During engine operation, the ECU 30 controls the injection timing and injection amount based on the output signals from the various sensors 81 to 87, such as an intake air amount sensor 81, a throttle valve opening amount sensor 82, a crank position sensor 83, a coolant temperature sensor 84, air-fuel ratio sensors 85 and 86, and an accelerator operation amount sensor 87.

With reference to FIG. 5A, the housing adapter valve 100 is shown in the closed state prior to injection. The bullet 104 is in slidable relation within the interior of the bullet chamber 134. The insert 108 is received within the insert chamber 136 and secured by the engagement of the internal threads 140 of the insert chamber 136 and the external threads 142 of the insert 108. The CNG injector 90 is retained within the injector chamber 138 due to the engagement of the seal 98 with the interior walls of the injector chamber 138, such that the injector nozzle 96 is engaged with the bore 148 of the insert 108.

In the closed position, the biasing force of the biasing member 106 biases the bullet 104 against the insert 108 in the direction of arrow F1. Specifically, the engagement portion 156 of the bullet 104 engages with the seat portion 150 of the insert 108 to form a mechanical seal such that the first end 152 of the bullet 104 blocks/closes the bore 148 of the insert 108, thereby, closing off the pathway from the inlet 110 to the outlet 112. As will be described later in greater detail, the engagement of the engagement portion 156 and the seat portion 150 allows the first end 152 to block the bore 148 to prevent blowback gas resulting from the ignition of the CNG within the combustion chamber 45 from flowing in an ingress direction of arrows A up the outlet 112 entering the bore 148 of insert 108. As such, the CNG injector 90 is prevented from being ejected from the injector chamber 138.

At the appropriate timing, the ECU 30, based on the output of the various signals, sends a control signal to the CNG injector 90 to initiate the injection of CNG. Upon injection of the CNG from the CNG injector 90, the adapter valve 100 moves from the closed position (FIG. 5A) to the injection position (FIG. 5B). During injection, the CNG injected by the CNG injector 90 flows through the bore 148 in an injection direction of arrow B. As the first end 152 is blocking the downstream side 144 of the bore 148 due to the engagement of the engagement portion 156 and the seat portion 150, the injected CNG, flowing in the direction of arrow B, pushes against the first end 152. As the first end 152 is generally flattened, the force applied by the injected CNG overcomes the biasing force of the biasing member 106 and the bullet 104 is moved from the closed position towards the injection position in the direction of arrow F2. The movement of the bullet 104 in the direction of arrow F2 from the closed position towards the injection position disengages the mechanical seal formed by the engagement of the seat portion 150 and the engagement portion 156. The compressive force needed to overcome the biasing force of the biasing member 106 is selected so as to be overcome by the force applied by the injected compresses fuel.

The continued force of the injected CNG will force the second end 154 of the bullet 104 to abut the end wall 180 of the bullet chamber 134. As the bore 148 is now unblocked due to the movement of the bullet 104 in the direction of F2, the injected CNG flows in the injection direction F2, as seen by arrows B, to bypass the first end 154 and passes through the plurality of passages 162 to bypass the bullet 104. The injected CNG flows through the second cavity 168 and the first cavity 164 to enter the nozzle passage 116 through the nozzle inlet 118 and exits the outlet 112 into the combustion chamber 45 in the injection direction of F2.

Upon competition of injection event, the injected CNG is no longer able to overcome the biasing force of the biasing member 106 and the biasing member 106 biases the bullet 104 from the injection position (FIG. 5B) to the closed position (FIG. 5A).

Concurrently with or subsequent to the injection event, the ECU 30 controls the igniter 59 of the spark plug 58 to ignite the CNG injected in the combustion chamber 45. Upon ignition of the injected CNG, the combustion of the CNG causes blowback gas arrows A to enter the outlet 112 of the housing 102. As the blowback gas arrows A flows in the ingress direction of arrow F1 the blowback gas passes through the nozzle path 116 and enters the bullet chamber 134 through the nozzle inlet 118. However, as the injection has ceased, the bullet 104 has moved from the injection position to the closed position and the blowback gas arrows A is prevented from entering the bore 148 due to the engagement of the engagement portion 156 and the seat portion 150 that blocks the path from the outlet 112 to the inlet 110. Specifically, although the blowback gas is able to enter the bullet chamber 134 and pass through the first cavity 164 and second cavity 168 of the bullet 104 to enter the plurality passages 162 to enter the portion of the bullet chamber 134 upstream of the bullet 104, the biasing force of the biasing member 106 prevents the blowback gas arrows A from disengaging the bullet 104 from the insert 108.

Specifically, the flattened shape of the first end 152 that is received within the seat portion 150, and the engagement of the engagement portion 156 with the seat portion 150, provides a mechanical seal between the bullet 104 and the insert 108. As such, during combustion stroke of the combustion chamber piston 42, blowback gas arrows A which enters through the outlet 112 is prevented from being applied to the CNG injector 90. Specifically, the mechanical seal between the bullet 104 and the seat portion 150 prevents blowback gas arrows A from the combustion from damaging the CNG injector 90.

Accordingly, the adapter valve 100 provides a one way gas passage valve which allows injected CNG arrows B to be diffused through the bullet 104 in an injection direction arrow F1 and enter the combustion chamber 45 through the outlet 112 while preventing the blowback gas arrows A due to the combustion from flowing, in an ingress direction arrow F1, to damage the CNG injector 90.

As discussed above, an advantage of the fuel injector assembly 18 and the fuel injection system 10, is the ability to use conventional CNG injectors that are typically utilized for intake injection rather than direct injection. As such, the CNG injectors 90 inject the CNG at an injection pressure that is lower than the fuel supply pressure and the fuel storage pressure.

Injecting the CNG at the fuel injection pressure that is lower than the fuel supply pressure, avoids the necessity to include additional components such as a high pressure pump to re-pressurizing the CNG which has previously been regulated from the CNG storage pressure within the range of 5,000 psi to 3,000 psi down to the supply pressure of less than 500 psi, and then up to a pressure similar to the gasoline injection pressure 1600 psi.

The housing 102 is formed of a metallic material that is capable of withstanding the heat and pressure of combustion within the combustion chamber 45. The bullet 104, biasing member 106, and insert 108 are also formed of a suitable material, such as a metallic material, to be able to withstand frequent use, and the contact of the blowback gases arrows A.

Figure 6A:
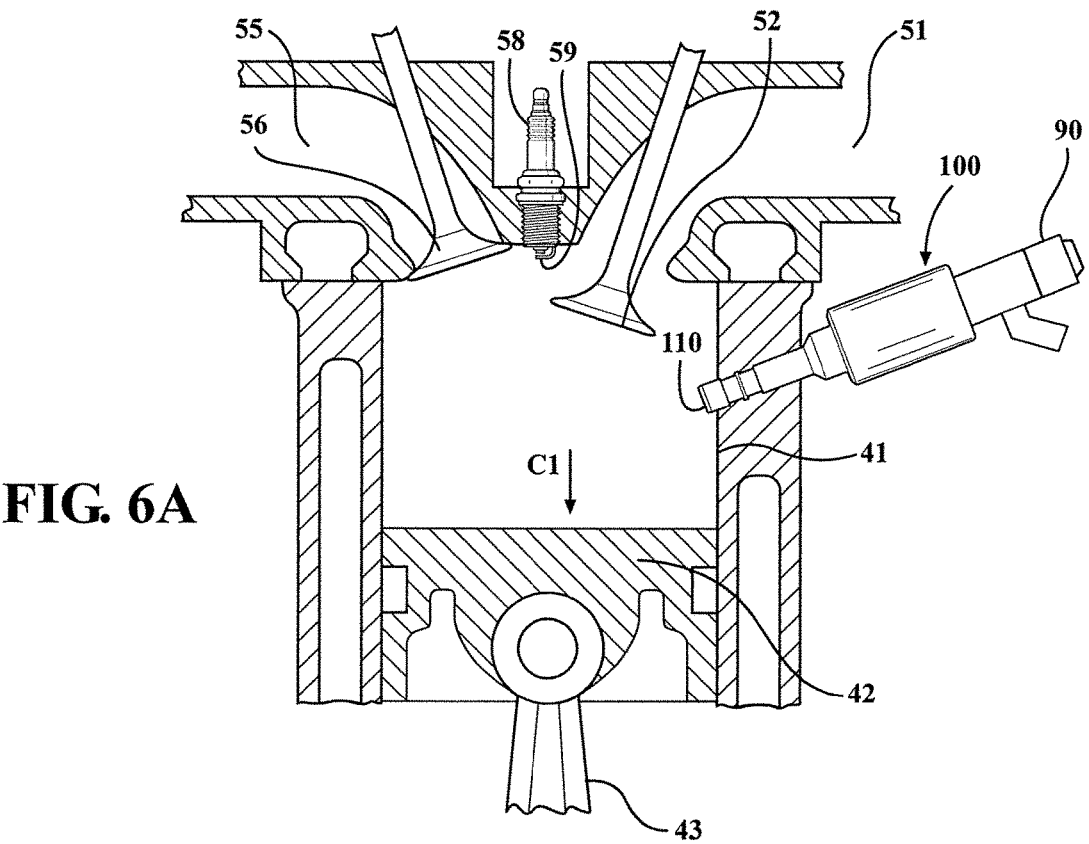
FIG. 6A is a schematic view of a combustion chamber nearing bottom dead center.
Figure 6B:
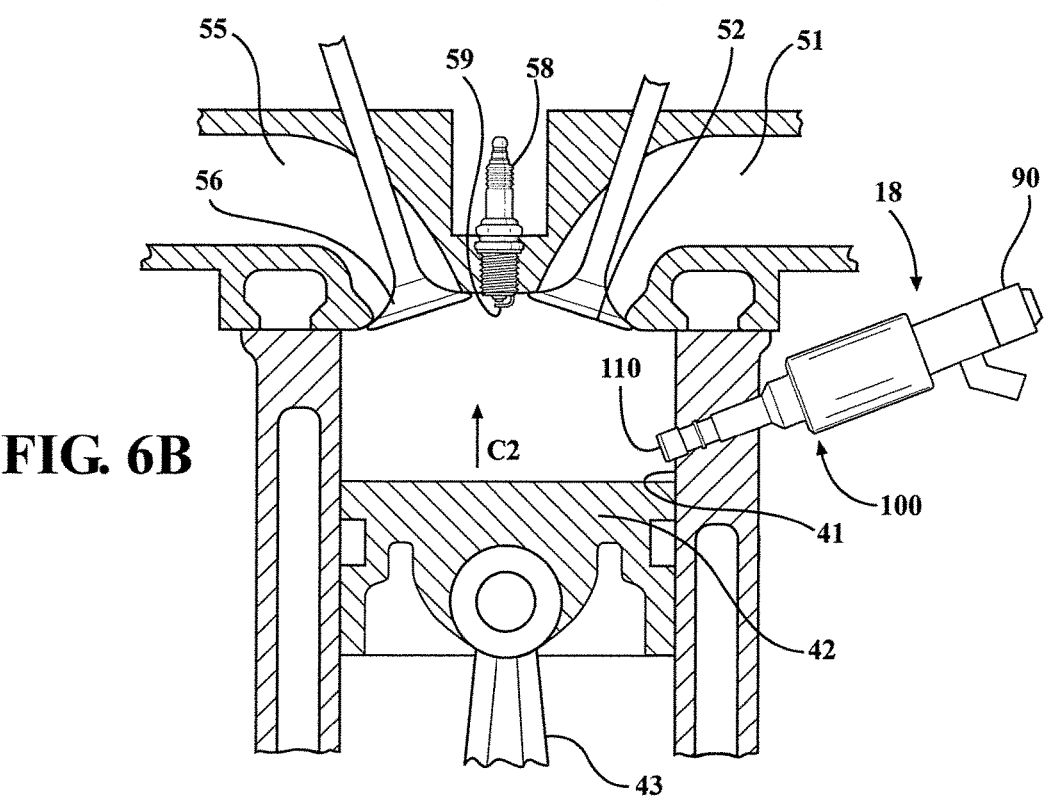
FIG. 6B is a schematic view of a combustion chamber nearing top dead center.

As seen in FIGS. 6A and 6B, the outlet 112 of the nozzle portion 114 of the housing 102 at least partially extends into the interior of the combustion chamber 45 such that the outlet 112 is disposed within the combustion chamber 45. As the CNG injector 90 is a conventional intake injector which is limited to an injection timing to the intake stroke of the piston, as the opening of the intake valve 52 in conjunction with the intake stroke of the piston 41 creates a vacuum that sucks the air from the intake port 51 in which the CNG was injected into, the duration of the indirect intake injection is limited to the intake stroke. However, as the fuel injector assembly 18 and the fuel injection system 10, is utilizes direct injection, the injection timing can be extended beyond the intake stroke.

The CNG injector 90 is controlled by the ECU 30 to inject the compressed natural gas in a wider time period than a normal intake injected system. Specifically, as the fuel injection assembly 18 is not limited to the intake stroke, the fuel injection assembly 18 has a wider window to inject the CNG into the combustion chamber 45. The injection window includes the intake stroke and the compression stroke.

As shown in FIGS. 6A and 6B, the internal combustion engine 14 is a four stoke cycle engine that operates in an intake, compression, ignition and exhaust strokes. As the crank shaft extends through two rotations during each complete four stroke cycle, each stoke is divided into 180° segments. At the start of each new cycle the intake stroke begins at 0° and progress to 180° which then begins the compression stroke as the piston 42 has moved from top dead center to bottom dead center. Upon completion of the intake stroke at the compression stroke starts at 180° at bottom dead center and progress to 270° at top dead center. It is appreciated, of course, that the above description is variable based upon particular engines and engine operating conditions.

As stated above, the indirect intake injection systems are limited to an injection time equal to the intake stroke as that is the only time that the intake valve 51 is open to allow the fuel injected into the air intake to enter the combustion chamber 45.

In the intake stroke, as shown in FIG. 6A, the intake valve 51 is open and the piston 42 is moving from a top dead center position towards bottom dead center in the direction of arrow C1. Upon competition of the intake stroke, the piston 42 moves from the bottom dead center towards the top dead center in the direction of arrow C2, as shown in FIG. 6B.

Figure 7:
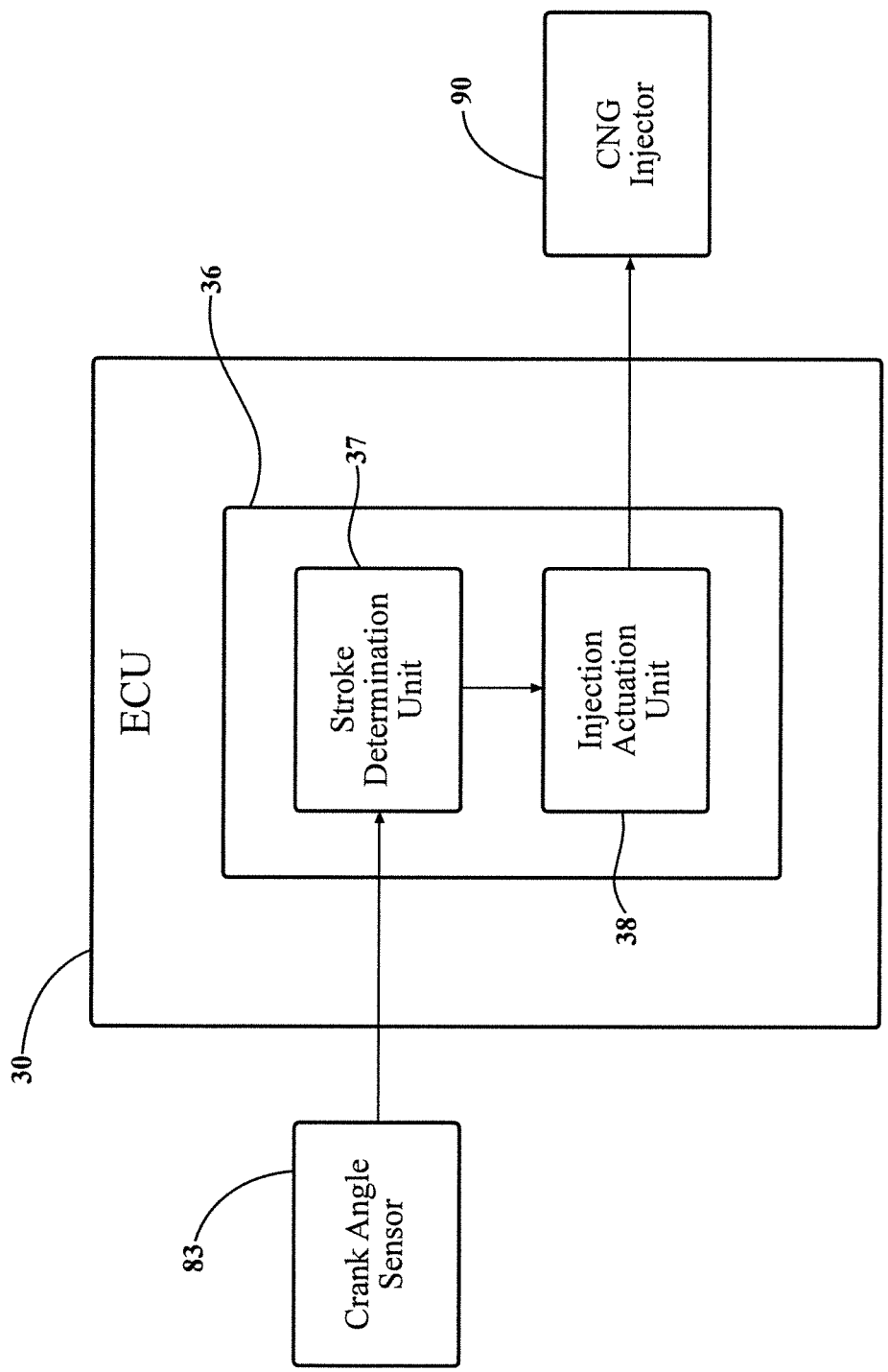
FIG. 7 is a schematic view illustrating the injection timing control unit.

In order to accurately control the injection timing of the CNG injector, the fuel injection system 10 is provided with an injection timing control unit 36, as seen in FIG. 7. The injection timing control unit 36 includes a stroke determination unit 37 and an injection actuation unit 38. It is appreciated, of course, that the injection timing control unit 36, the stroke determination unit 37 and the injection actuation unit 38 are portions of the ECU 30 and are programmed to operate in the identified manner.

The stroke determination unit 37 is connected to the crank angle sensor 83 and receives the output from the crank angle sensor 83 to determine the current stroke of the cylinders 41. The identification of the current stroke of the cylinders 41 is provided to the injection actuation unit 38 which outputs an injection signal to the CNG injector 90 based on the current stroke of the cylinders 41. As described in greater detail below, the stroke determination unit 37 includes a prestored first threshold and a prestored second threshold. The first threshold is a crank angle that corresponds to the initiation of the intake stroke and the second threshold is a crank angle within the compression stroke. As an illustrative example, the first threshold is set at a crank angle of 0° and the second threshold is set within the range of 180° to 360° preferably within the range of 240° to 300°. It is appreciated, of course, that the thresholds are not limited to the examples provided herein.

Figure 8:
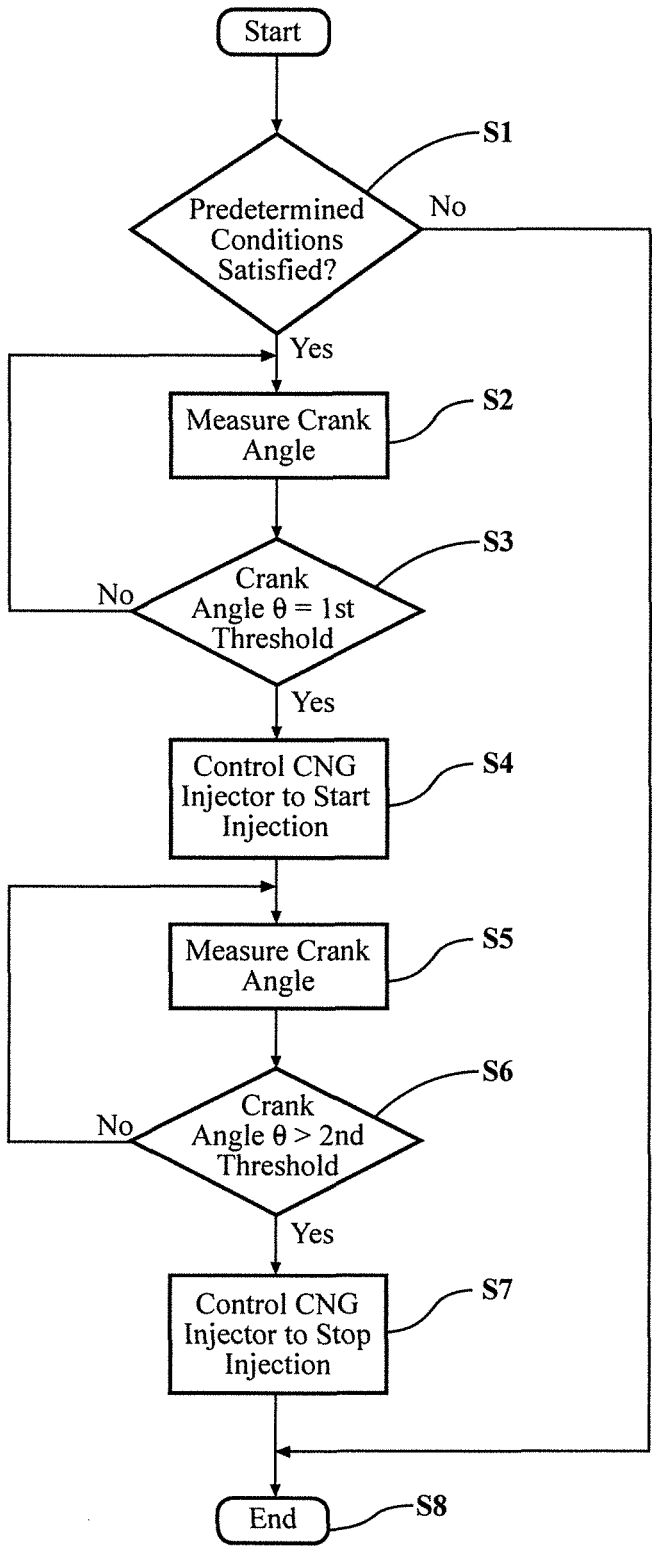
FIG. 8 is a flowchart showing an example of an injection timing control method.

FIG. 8 is a flowchart showing an example of an injection timing control method executed by the ECU 30, specifically, the injection timing control unit 36.

In step S1, it is determined whether predetermined conditions have been satisfied. The predetermined conditions, relate to the operational state of the engine such as engine speed. When it is determined that the predetermined conditions have not been satisfied (NO in S1), the process proceeds to step S8 and the process is terminated.

On the other hand, when it is determined that the predetermined conditions have been satisfied, the process proceeds to step S2. In step S2, the crank angle $\theta$ is measured by the crank angle sensor 83. The process proceeds to step S3.

In step S3, the crank angle $\theta$ as determined by the crank angle sensor 83 is compared to a first threshold by the stroke determination unit 37. The stroke determination unit 37 includes a prestored first threshold and compares the crank angle $\theta$ to the first threshold to determine the current stroke of the cylinder 41. Specifically, the first threshold is set such that when the crank angle $\theta$ is not equal to the first threshold, the cylinder has not begun the intake stroke for the current cycle or has already performed the intake stroke for the current cycle. When the crank angle $\theta$ is equal to the first threshold, the stroke determination unit 37 determines that the cylinder 41 is starting the injection stroke.

When it is determined that the crank angle $\theta$ is not equal to the first threshold (NO in step S3) the process repeats the determination of step S2 and step S3. On the other hand, when it is determined that the crank angle $\theta$ is equal to the first threshold (YES in step S3) the process proceeds to step S4.

In step S4, the CNG injector 90 is controlled to start injection, or continue injection if injection is current being performed, by the injection actuation unit 38, as the stroke determination unit 37 determined that the cylinder 41 has begun the intake stroke.

The process proceeds to step S5 where the current crank angle $\theta$ is measured by the crank angle sensor 83. The process proceeds to step S6.

In step S6, the crank angle $\theta$ as determined by the crank angle sensor 83 is compared to a second threshold by the stroke determination unit 37. The stroke determination unit 37 includes a prestored second threshold and compares the crank angle $\theta$ to the second threshold to determine the current stroke of the cylinder 41. Specifically, the second threshold is set such that when the crank angle $\theta$ is less than the second threshold, the cylinder 41 is undergoing the compression stroke for the current cycle. The exact second threshold is set such that once the crank angle $\theta$ is greater than the second threshold, the CNG injector 90 would be incapable of injecting further CNG into the combustion chamber 45 due to the compression therein.

When it is determined that the crank angle θ is not greater than the second threshold (NO in step S6) the process repeats the determination of step S4 and step S5. On the other hand, when it is determined that the crank angle θ is greater than the second threshold (YES in step S6) the process proceeds to step S7.

In step S7, the CNG injector 90 is controlled to stop injection by the injection actuation unit 38, as the stroke determination unit 37 determined that the cylinder 41 has finished or almost finished the compression stroke.

The process proceeds to step S8 and terminates. It is appreciated, of course, that the above described process is executed for each cylinder 41 of the internal combustion engine 14, or is executed for a single cylinder that is used as a datum for the reaming cylinders, as the time differential between the datum cylinder and the remaining cylinders is known.

Accordingly, the fuel injector assembly 18 provides a system in which CNG at an injection pressure of less than 300 psi, preferably between the range of 75 to 150 psi, and more preferably at 120 psi can be used effectively in a direct injection of the combustion chamber 45.

Specifically, the fuel injection system 10 and the fuel injector 18 can be controlled by the ECU 30 to inject the CNG during the intake stroke and partially through the compression stroke so as to receive additional amounts of CNG within the combustion chamber 45. The system would allow for an increase in the injection timing to include the intake stroke and at least a portion of the compression stroke. Therefore, an increased amount of CNG can be injected by a conventional indirect intake CNG injector through application in a direct injection system.

A particular advantage of fuel injector assembly 18 and the fuel injection system 10, is the use of a conventional CNG injector to be used in a direct injection. Accordingly, the conversion of a gasoline direct injection fuel system to a compressed natural gas direct inject fuel injection system can be easily provided with the avoidance of the increased undue number of specific parts. Rather, the fuel injection system 10 and the fuel injector assembly 18 can be provided in a simple and cost-reductive manner.

Using low pressure gas and having a mechanism to use this in the combustion chamber of a direct injection engine, will reduce cost and complexity of converting a direct injection engine to a compressed gas fuel. This can be accomplished by blocking the blowback gas from the combustion chamber from reaching the CNG injector, when using low pressure CNG intake injector which injects CNG at an injection pressure between 75 and 150 psi.

Moreover, by providing the insert 108 and housing 102 so as to be releasably attachable by corresponding internal threads 140 and external threads 142, respectively, the fuel injector assembly 18 allows for easy serviceability in which wear on the bullet 104 and biasing member 106 can be monitored and easily replaced.

The housing 102 is formed of a suitable material, such as a metallic material, that is capable of withstanding the heat and pressure of combustion within the combustion chamber.

It is appreciated, of course, that the location of the fuel injector assembly 18 is not limited to the illustrated embodiment. An alternative example includes the configuration that the fuel injector assembly 18 includes a one piece unit in which the fuel injector and the adaptor valve are united.

In a further alternative embodiment, the adaptor valve is integrated into the fuel injector such that an outlet of the united fuel injector assembly includes a cap that provides the mechanical seal to prevent the blowback gas from entering the outlet. The cap is provided in a fitting engagement with the outlet in the closed position. An internal valve operates to move the cap from a closed position to an injection position. A shaft is optionally attached to the internal valve and extends through the nozzle portion of the united fuel injector assembly and an opposite end of the shaft is connected to the cap. Movement of the valve by the compressed gas operates to move the shaft to articulate the cap between the closed and injection positions. Upon injection of the compressed fuel, the cap is moved into the injection position in a first direction. In the injection direction the cap is spaced apart from the outlet to allow the compressed gas to be injected into the combustion chamber. Upon completion of the injection process, the cap is moved back into the closed position to prevent blowback gas from the combustion of the injected gas to enter into the outlet of the united fuel injector assembly.

Although the discussion of the present invention has been made in relation to a compressed natural gas, the present invention is not limited to such fuel source. Specifically, the present invention is operable with a plurality of alternative compressed fuels provided in a compressed gaseous or liquid nature.

Having described my invention, other and additional preferred embodiments will become apparent to those of ordinary skill in the art to which it pertains, and without deviation from the scope of the disclosure.

It is claimed:

1. A fuel injector assembly adapted to inject a compressed fuel directly into a combustion chamber of an internal combustion engine, the compressed fuel stored in a fuel storage tank at a fuel storage pressure and delivered to said fuel injection assembly through a fuel rail, said fuel injector assembly comprising:
   a fuel injector connected to the fuel rail, the fuel rail having a fuel supply pressure that is lower than the fuel storage pressure, the fuel injector configured to inject the compressed fuel; and
   an adapter valve positioned between said fuel injector and the combustion chamber, said adapter valve having an inlet and an outlet, said inlet adapted to receive a portion of said fuel injector, and said outlet in communication with the combustion chamber, said adapter valve allowing the compressed fuel injected by said fuel injector to be discharged from said outlet into the combustion chamber in an injection direction while preventing blowback gas from passing through said adapter valve in an ingress direction opposite said injection direction.

2. The fuel injector assembly of claim 1, wherein said fuel injector injects the compressed fuel at a fuel injection pressure, said fuel injection pressure is lower than the fuel supply pressure.

3. The fuel injector assembly of claim 1, wherein said fuel injector is compressed natural gas fuel injector.

4. The fuel injector assembly of claim 1, wherein said adapter valve includes a housing having a nozzle portion, a bullet chamber and an injector chamber, said nozzle portion having a nozzle path extending from said outlet to said bullet chamber, said injector chamber in communication with said bullet chamber and adapted to receive at least a portion of said fuel injector,
   wherein said adapter valve includes a bullet slidingly received within said bullet chamber of said housing, said bullet moveable between an injection position and a closed position, in said injection position compressed fuel injected by said fuel injector passes through said bullet in said injection direction to exit said outlet, and in said closed position blowback gas is prevented by said bullet from exiting said inlet in said ingress direction.

5. The fuel injector assembly of claim 4, wherein said adapter valve includes a biasing member that biases said bullet towards said closed position.

6. The fuel injector assembly of claim 5, wherein said adapter valve includes an insert positioned in said housing between said bullet chamber and said injector chamber, said insert having a bullet side, an injector side, and a passageway connecting said bullet side with said injector side.

7. The fuel injector assembly of claim 6, wherein said bullet has a first end and an opposite second end, said first end abutting against said bullet side of said passageway in said closed positioned to prevent blowback gas entering said outlet from passing through said adapter valve.

8. The fuel injector assembly of claim 7, wherein said bullet includes a tapered portion adjacent said first end, said tapered portion having at least one passage extending from said tapered portion to said second end, and wherein upon injection of the compressed fuel by said fuel injector, an injection pressure overcomes a biasing force of said biasing member to move said bullet from said closed position to said injection position, and wherein the compressed fuel enters said at least one passage to flow through said bullet and into the combustion chamber through said outlet of said nozzle portion.

9. The fuel injector assembly of claim 8, wherein said tapered portion of said bullet includes a plurality of passages extending from said tapered portion to said second end.

10. The fuel injector assembly of claim 8, wherein said bullet includes an annular wall extending outwardly from a central portion to form a generally hollow cylindrical portion adjacent said second end.

11. The fuel injector assembly of claim 10, wherein said biasing member is at least partially received within said generally hollow cylindrical portion of said bullet.

12. A fuel injection system configured to inject a compressed fuel directly into a combustion chamber of an internal combustion engine, the compressed fuel stored in a fuel storage tank at a fuel storage pressure and delivered to said fuel injection assembly through a fuel supply line at a fuel supply pressure that is lower than the fuel storage pressure, said fuel injection system comprising:
a fuel injector connected to the fuel supply line, the fuel injector configured to inject the compressed fuel;
an adapter valve positioned between said fuel injector and the combustion chamber, said adapter valve having an inlet and an outlet, said inlet adapted to receive a portion of said fuel injector, and said outlet in communication with the combustion chamber, said adapter valve allowing the compressed fuel injected by said fuel injector to be discharged from said outlet into the combustion chamber in an injection direction while preventing blowback gas from passing through said adapter valve in an ingress direction opposite said injection direction;
a crank angle sensor that detects a crank angle of a crank shaft of the internal combustion engine;
an injection timing control unit programmed to compare said crank angle detected by said crank angle sensor to determine a current stroke of a cylinder of the internal combustion engine, said injection timing control unit programmed to control said fuel injector to initiate injection at a beginning of an intake stroke, and said injection timing control unit programmed to control said fuel injector to inhibit injection after a completion of said intake stroke.

13. The fuel injection system of claim 12, wherein said injection timing control unit is an electronic control unit.

14. The fuel injection system of claim 12, wherein said injection timing control unit is programmed to control said fuel injector to inhibit injection during a compression stroke.

15. The fuel injection system of claim 14, wherein said injection timing control unit includes a prestored first threshold, said injection timing control unit compares said crank angle detected by said crank angle sensor to said prestored first threshold to determine whether the internal combustion engine has begun an injection stroke.

16. The fuel injection system of claim 15, wherein said injection timing control unit includes a prestored second threshold, said injection timing control unit compares said crank angle detected by said crank angle sensor to said prestored second threshold to determine whether the internal combustion engine has begun said compression stroke.

17. A fuel injector assembly adapted to inject a compressed fuel directly into a combustion chamber of an internal combustion engine, the compressed fuel stored in a fuel storage tank at a fuel storage pressure and delivered to said fuel injection assembly through a fuel supply line at a fuel supply pressure that is lower than the fuel storage pressure, said fuel injector assembly comprising:
a fuel injector having a nozzle, the fuel injector connected to the fuel supply line, the fuel injector configured to inject the compressed fuel; and
an adapter valve positioned between said fuel injector and the combustion chamber, said adapter valve having an inlet and an outlet, said inlet adapted to receive a portion of said fuel injector such that said nozzle is positioned between said inlet and said outlet of said adapter valve, and said outlet in communication with the combustion chamber, said adapter valve allowing the compressed fuel injected by said fuel injector to be discharged from said outlet into the combustion chamber in an injection direction while preventing blowback gas from passing through said adapter valve in an ingress direction opposite said injection direction.

18. The fuel injector assembly of claim 17, wherein said fuel injector is compressed natural gas fuel injector.

19. The fuel injector assembly of claim 17, wherein said adapter valve includes a housing having a nozzle portion, a bullet chamber and an injector chamber, said nozzle portion having a nozzle path extending from said outlet to said bullet chamber, said injector chamber in communication with said bullet chamber and adapted to receive at least a portion of the fuel injector,
wherein said adapter valve includes a bullet slidingly received within said bullet chamber of said housing, said bullet moveable between an injection position and a closed position, in said injection position compressed fuel injected by said fuel injector passes through said bullet in said injection direction to exit said outlet, and in said closed position blowback gas is prevented by said bullet from exiting said inlet in said ingress direction.

20. The fuel injector assembly of claim 19, wherein said adapter valve includes a biasing member that biases said bullet towards said closed position.

21. The fuel injector assembly of claim 20, wherein said adapter valve includes an insert positioned in said housing between said bullet chamber and said injector chamber, said insert having a bullet side, an injector side, and a passageway connecting said bullet side with said injector side.

22. The fuel injector assembly of claim 21, wherein said bullet has a first end and an opposite second end, said first end abutting against said bullet side of said passageway in said closed position to prevent blowback gas entering said outlet from passing through said adapter valve.

23. The fuel injector assembly of claim 22, wherein said bullet includes a tapered portion adjacent said first end, said tapered portion having at least one passage extending from said tapered portion to said second end, and wherein upon injection of the compressed fuel by said the injector, an injection pressure overcomes a biasing force of said biasing member to move said bullet from said closed position to said injection position, and wherein the compressed fuel enters said at least one passage to flow through said bullet and into the combustion chamber through said outlet of said nozzle portion.

24. A fuel injector assembly adapted to inject a compressed fuel directly into a combustion chamber of an internal combustion engine, the compressed fuel stored in a fuel storage tank at a fuel storage pressure and delivered to said fuel injection assembly through a fuel supply line at a fuel supply pressure that is lower than the fuel storage pressure, said fuel injector assembly comprising:
   a fuel injector connected to the fuel supply line, the fuel injector configured to inject the compressed fuel at a fuel injection pressure that is less than the fuel supply pressure; and
   an adapter valve positioned between said fuel injector and the combustion chamber, said adapter valve having an inlet and an outlet, said inlet adapted to receive a portion of said fuel injector, and said outlet in communication with the combustion chamber, said adapter valve allowing the compressed fuel injected by said fuel injector to be discharged from said outlet into the combustion chamber in an injection direction while preventing blowback gas from passing through said adapter valve in an ingress direction opposite said injection direction.

25. A fuel injector assembly adapted to inject a compressed fuel directly into a combustion chamber of an internal combustion engine, the compressed fuel stored in a fuel storage tank at a fuel storage pressure and delivered to said fuel injection assembly through a fuel supply line at a fuel supply pressure that is lower than the fuel storage pressure, said fuel injector assembly comprising:
   a fuel injector connected to the fuel supply line, the fuel injector configured to inject the compressed fuel; and
   an adapter valve positioned between said fuel injector and the combustion chamber, said adapter valve having an inlet and an outlet, said inlet adapted to receive a portion of said fuel injector, and said outlet in communication with the combustion chamber, said adapter valve having a housing that includes an annular seat portion, a bullet chamber, and a bullet slidingly received within said bullet chamber, said bullet having a first end, an annular engagement portion adjacent said first end, an internal cavity, and a plurality of passages that connect an exterior of said bullet to said internal cavity,
   said bullet moveable between an injection position and a closed position, in said injection position compressed fuel injected by said fuel injector passes through said bullet via said plurality of passages to be discharged from said outlet into the combustion chamber in an injection direction, and in said closed position said annular engagement portion engages with said annular seat portion to prevent blowback gas from passing through said bullet in an ingress direction opposite said injection direction.

* * * * *